United States Patent

O'Brill et al.

[11] Patent Number: 5,937,081
[45] Date of Patent: Aug. 10, 1999

[54] IMAGE COMPOSITION SYSTEM AND METHOD OF USING SAME

[76] Inventors: Michael R. O'Brill, 8116 N. Lorel Ave., Skokie, Ill. 60077; William J. Cloutier, 1103 S. Forums Ct., #3A, Wheeling, Ill. 60090

[21] Appl. No.: 08/630,439

[22] Filed: Apr. 10, 1996

[51] Int. Cl.⁶ .................................................. G06K 9/00
[52] U.S. Cl. .............................. 382/111; 348/77; 345/435; 345/964; 364/188; 364/192; 364/470.03; 434/94; 434/75; 434/371
[58] Field of Search ...................................... 382/100, 111, 382/284; 395/100; 364/470.03, 188, 192; 348/77; 345/435, 964; 434/75, 94, 371

[56] References Cited

U.S. PATENT DOCUMENTS 4,261,012  4/1981  Maloomian ............................. 382/100
4,539,585  9/1985  Spackova et al. ...................... 382/100

*Primary Examiner*—Andrew W. Johns
*Assistant Examiner*—Hieu C. Le
*Attorney, Agent, or Firm*—Higgs, Fletcher&Mack LLP; Bernard L. Kleinke

[57] ABSTRACT

The image composition system includes a display device coupled to a central processing device for displaying a user selected image. A camera coupled to the central processing device enables a real subject to be incorporated into the user selected image. Accessory items are stored in a memory device coupled to the central processing unit for combining with the subject in the user selected image.

19 Claims, 9 Drawing Sheets

IMAGE COMPOSITION SYSTEM AND METHOD OF USING SAME

TECHNICAL FIELD

The present invention relates in general to an improved image composition system and a method of using it. The invention more particularly relates to an image composition system which may be used to visualize a tangible object combined with an intangible accessory object, and which system can be utilized according to a novel method.

BACKGROUND ART

There have been many types of image composition systems for facilitating the visualization of possible combinations of objects. For example, reference may be made to U.S. Pat. Nos.: 5,368,485; 5,163,006; and 4,232,334.

U.S. Pat. No. 5,368,485 discloses an overlay system for composing an image of a window and an associated window treatment to facilitate the selection of a suitable window treatment for a particular window. The system utilizes a collection of drawings illustrating possible window styles and a collection of overlays illustrating window treatments to build the image containing the window and window treatment. Thus, the system was limited to using a window illustration which might not correspond precisely to the particular window for which the window treatment is desired.

U.S. Pat. Nos. 5,163,006 and 4,232,334 disclose image systems which incorporate the actual subjects of the image into the image itself (i.e., the person who will be wearing a swimsuit, and the face which will receive the makeup pattern) to more clearly visualize how the subject would appear with the accessory items. A similar image system is used to create an image by incorporating the face of a person with predetermined hairstyles to facilitate the selection of a hairstyle suitable for the person.

Although these image systems were adequate for some applications, the image systems do not necessarily display the subject with an added item suitably dimensioned and proportioned relative to the subject. In this regard, the added items could be utilized for subjects of varying sizes and shapes, thereby reducing the effectiveness of the visualization of the subject with the added item.

Therefore, it would be highly desirable to have a new and improved image composition system which produces an image of a subject with an image of a suitably dimensioned and proportioned added item, which image composition system can be used to facilitate the faithful visualization of the subject as it would appear with the added item. Such an image composition system should be convenient to use, and be capable of functioning with a variety of subjects and accessory items.

DISCLOSURE OF INVENTION

Therefore, the principal object of the present invention is to provide a new and improved image composition system, and a method of using it, wherein the system permits the combination of a subject and an accessory item to be faithfully visualized, and which system can operate with a variety of subjects and accessory items.

Briefly, the above and further objects of the present invention are realized by a new and improved image composition system which closely depicts a subject combined with an added item in a properly composed overall image as the combination would exist in the real world according to a novel method and apparatus of the present invention.

The image composition system includes a display device coupled to a central processing device for displaying a user selected image. A camera coupled to the central processing device enables an image of a real subject to be incorporated into the user selected image of an added item. Information indicative of the added items are stored in a memory device coupled to the central processing unit for facilitating the desired combining of the selected added item image with the subject image under the control of the user.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
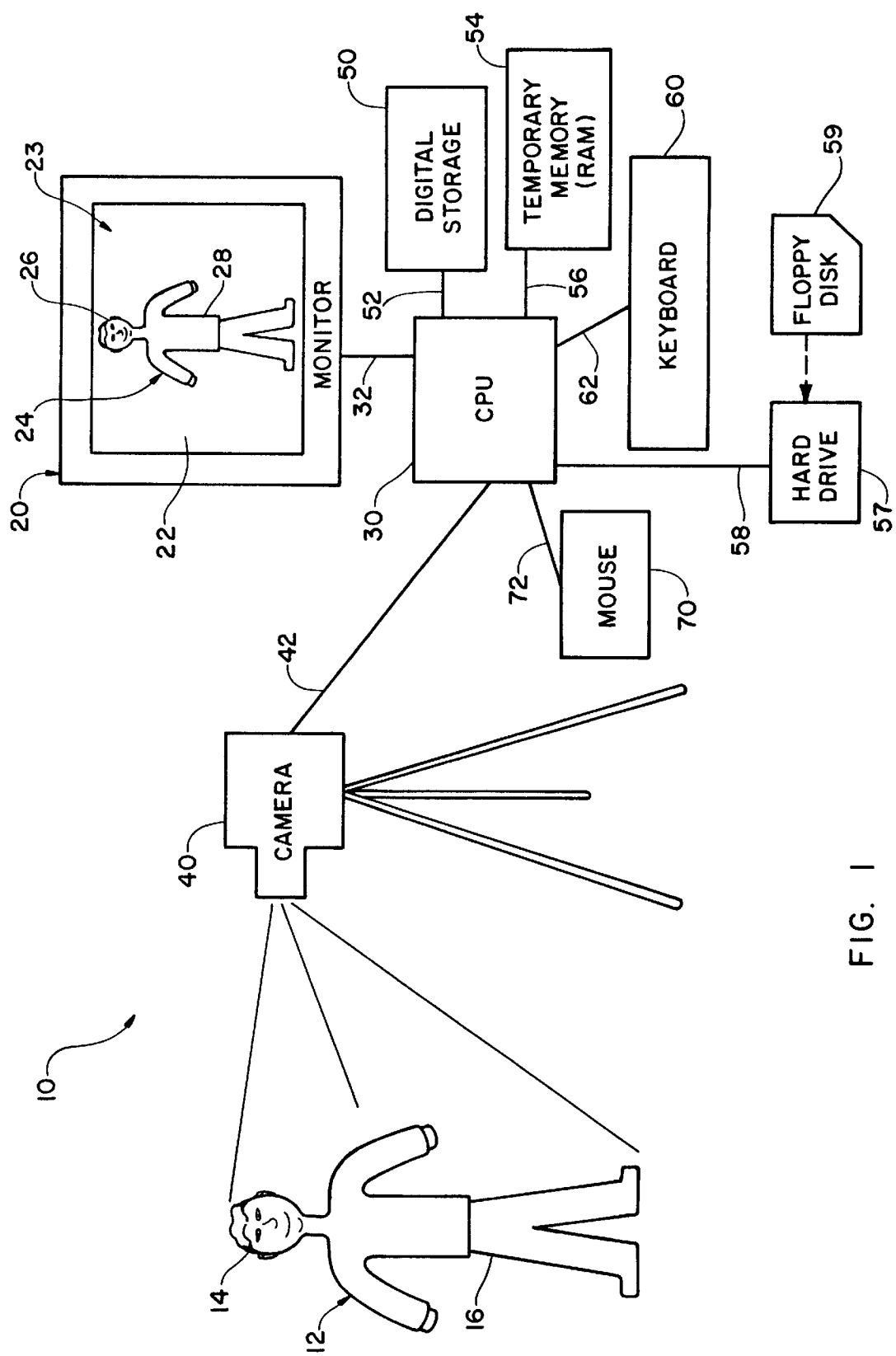
FIG. 1 is a diagrammatic view of an image composition system, which is constructed in accordance with the present invention.

Referring now to the drawings, and more particularly to FIG. 1 thereof, there is shown an image composition system 10, which is constructed in accordance with the present invention. The system 10 facilitates the viewing of a real world subject, such as a person 12, in a virtual environment to enable the visualization of the subject as it would appear with a selected added item or accessory item (not shown), wherein the combination of the person 12 and the accessory item can be visualized without the accessory item being physically present with the person 12. It will become apparent to those skilled in the art that there can be a variety of other types and kinds of subjects and added items. For example, the subject can be the interior space such as a room in a building, and the selected added items can be items of furniture. Another example is where the subject can be a building exterior, and the selected added items are items of landscaping.

The system 10 generally comprises a monitor 20 having a screen display 22 for displaying a user selected image 23. A central processor unit (CPU) 30 is coupled to the monitor 20 by conductor 32 to help control the composition of the user selected image 23.

In order to integrate the subject or target 12 into the user selected image 23 to enable the subject 12 to be visualized in the virtual environment as a subject or human image 24, the system 10 further includes a camera 40 coupled to the CPU 30 by conductor 42. A digital storage or memory device 50 coupled to the CPU by conductor 52 stores accessory item information indicative of accessory item images to be combined with the human image 24 to create the user selected image 23.

By incorporating the subject into the user selected image 23, the system 10 enables the subject 12 to be combined with the accessory items in the user selected image 23. In this regard, the subject 12 is a core element of the user selected image, and the accessory items are positioned relative to the subject 12 to create the user selected image 23.

For example, the subject 12 of the system 10 is shown as a person. The accessory items stored in the digital storage device 50 may be indicative of clothing items which could be worn by the person, wherein the system 10 enables various clothing items to be combined with the person in the user selected image 23.

Although in the preferred form of the invention, the subject 12 is a person, the system 10 may be used with other subjects. In this regard, the system 10 could be utilized to compose user selected images of interior design images (FIG. 15), landscape design images (FIG. 16), and other design images wherein it is desired to view a particular real world subject in combination with stored images of accessory items to enable the subject to be visualized in a virtual environment with the accessory items.

In operation, the camera 40 generates subject or target image video information indicative of the subject or target image 24 based on the subject 12. The CPU 30 incorporates the human image 24 into the user selected image 23 to facilitate the visualization of the subject 12 in the virtual environment. Accessory item information is stored in the digital storage device 50, and is indicative of clothing item images which can be combined with the human image 24 to form the user selected image 23.

The control of the system 10 may be provided by hardware, or by software residing in the digital storage device 50. Alternatively, a hard drive 57 may be coupled to the CPU 30 by a conductor 58 for receiving a floppy disk 59 containing the operational software thereon.

Considering now the stored accessory item information, the stored accessory item information is indicative of clothing images, such as clothing images 210 (FIG. 2) and 310 (FIG. 3), which are to be combined with the human image 24 to create the user selected image 23. The clothing images may represent pants (FIG. 2), shirts (FIG. 3), as well as other clothing items which may be worn by the person 12.

Figure 2:
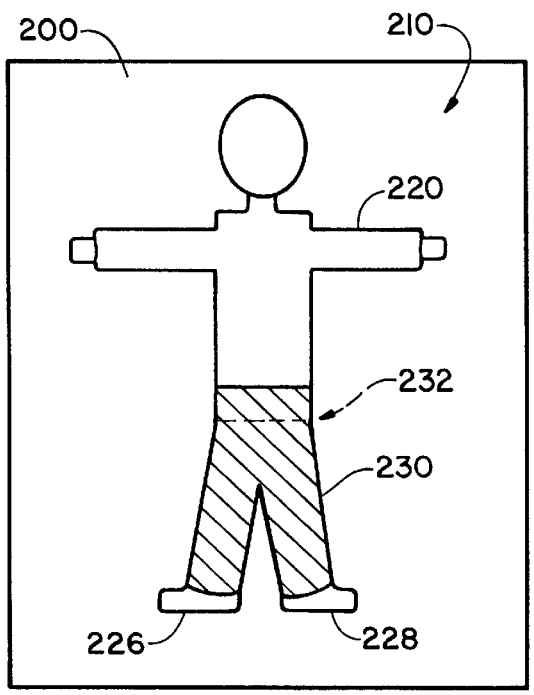
FIG. 2 is a pictorial view of a clothing item used by the image composition system of FIG. 1.

FIG. 2 illustrates a pants screen display 200 stored in the memory device 50, and containing the clothing image 210 therein. The clothing image 210 (FIG. 2) includes a mannequin image 220 having associated feet images 226 and 228, and also includes a pants image 230 as worn by the mannequin image 220.

The stored accessory item information further includes attribute information for the pants image 230, which will be described hereinafter in greater detail, for facilitating the placement of the pants image 230 with other accessory items relative to the human image 24. In this regard, the pants image 230 includes an overlap portion 232 where another accessory item image may coincide with the pants image 230 in the user selected image 23.

Figure 3:
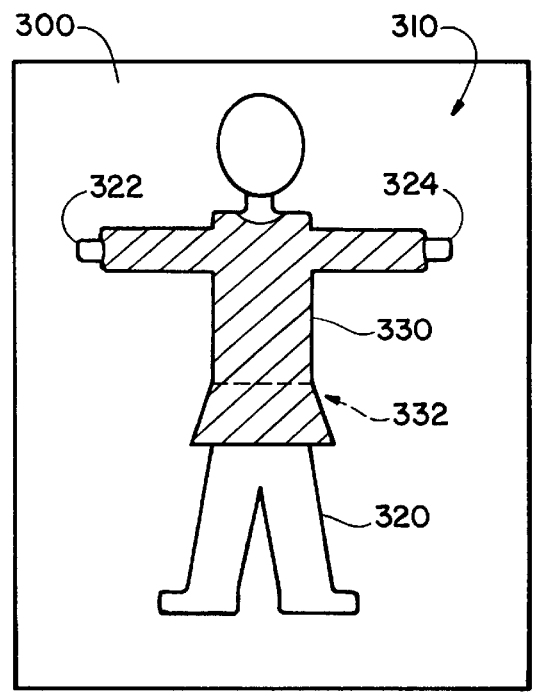
FIG. 3 is a pictorial view of another clothing item used by the image composition system of FIG. 1.

FIG. 3 illustrates a shirt screen display 300 also stored in the memory device 50, and containing the clothing image 310 thereon. It will be understood by one skilled in the art that the accessory item information could also be stored on the floppy disk too, on CD-ROM (not shown) or on a remote memory device (not shown) coupled to the system 10 by a modem device (not shown). The clothing image 310 includes a mannequin image 320 having hand images 322 and 324, and further includes a shirt image 330 as worn by the mannequin image 320. The shirt image 330 similarly has attribute information associated therewith, and also has an overlap portion 332 for cooperating with other accessory items to create the user selected image 23.

The attribute information is indicative of where the associated accessory item is typically worn by the person 12, and the relative hierarchy of the accessory item as compared to the other accessory items. For example, a shirt image may be assigned an attribute of 1 indicating that it is the lowermost layer of clothing, while a pants image might be assigned an attribute of 2 indicating that the pants overly the shirt. Thus, the disposition of the overlap portions 232 and 332, which coincide when the pants image 230 and the shirt image 330 are combined, is determined by their respective attributes.

In this case, overlap portion 232 would be displayed while overlap portion 332 is not displayed due to the attribute of the pants image 230 being larger than the attribute of the shirt image 330. Other assignments of the relative hierarchy are also contemplated, wherein the superimposing of an image relative to another is accomplished.

To increase the flexibility of the system 10, the attributes of the stored accessory items may be modified. Thus, changing the attributes associated with the pants image 230 and the shirt image 330 enables the overlap portion 332 to be displayed instead of the overlap portion 232 to simulate the shirt tail of the shirt image 330 to hang over the pants image 230.

The stored accessory item information further includes size information to facilitate the selection of pants image 210 and shirt image 310 which correspond to the body type of the person 12. In this regard, a plurality of pants item images and a plurality of shirts images may be stored for various body types of persons, wherein the appropriately sized images may be selected to more closely correspond to the body type of the subject person.

Additional accessory item information indicative of other clothing items, e.g., hats, ties, gloves, jackets, shoes, etc., may also be stored in a manner consistent with the image 230 and the shirt image 330.

Figure 4:
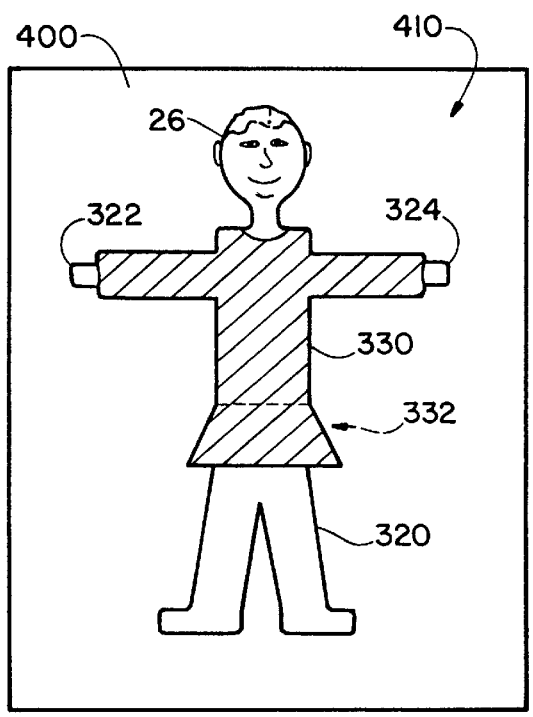
FIG. 4 is a pictorial view of a user selected image, including the clothing item of clothing of FIG. 3, displayed by the image composition system of FIG. 1.
Figure 5:
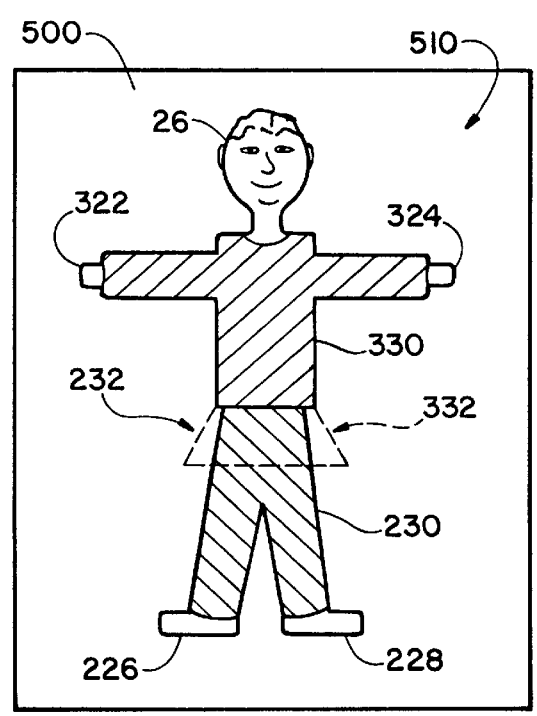
FIG. 5 is a pictorial view of another user selected image, including the clothing item of FIG. 3 and the clothing item of FIG. 4, displayed by the image composition system of FIG. 1.

Considering now the operation of the system 10 in greater detail with reference to FIGS. 1 and 4–5, the subject or person 12, including a head 14 and a body 16 thereof, are incorporated into the user selected image 23 as the subject or human image 24 including a head image 26 and a body image 28, wherein the user selected image 23 is displayed on the screen display 22.

The background behind the person 12 is preferably isolated from the person 12, and eliminated when displayed on the screen 22. The background may be removed using conventional filtering devices or software. In this regard, a color neutral or color controlled background screen (not shown) may be used to facilitate the separation of the person 12 from the background.

The body image 28 is subsequently removed from the head image 26, thereby leaving the head image 26 to function as the core element of the user selected image 23.

Upon the selection of the stored shirt image 330, the shirt image 330 is combined with the head image 26 in screen display 400 as user selected image 410. User selected image 410 is similar to image 23 (FIG. 1), except that the body image 28 has been replaced with the mannequin image 320, including the hand images 322 and 324, wearing the shirt image 330.

The selection of the shirt image 330 may be aided by displaying the head image 26 and the shirt image 330 in a split-window manner, wherein the shirt image 330 is selected with a cursor arrow (not shown) controlled by the mouse 70, and dragged into position. Alternatively, a menu (not shown) may be provided, wherein the shirt image 330 is selected at the menu and automatically inserted into position below the head image 26 using conventional techniques.

Similar to the selection of the shirt image 330, the pants image 230 is selected to combine it with the shirt image 330 and the head image 26 to create the user selected image 510 as displayed on screen display 500. The user selected image 510, thus, includes the head image 26 positioned above the shirt image 330. Positioned below the shirt image 330 is the pants image 230, with the feet images 226 and 228 displayed. As shown in the user selected image 510, the overlap 232 is displayed while the overlap portion 332 is not displayed. In this regard, the attributes of the shirt image 330 are such that the overlap portion 332 is not displayed when the overlap portion 332 coincides therewith (i.e., the pants image 230 is set to be superimposed over the shirt image 330).

Figure 6:
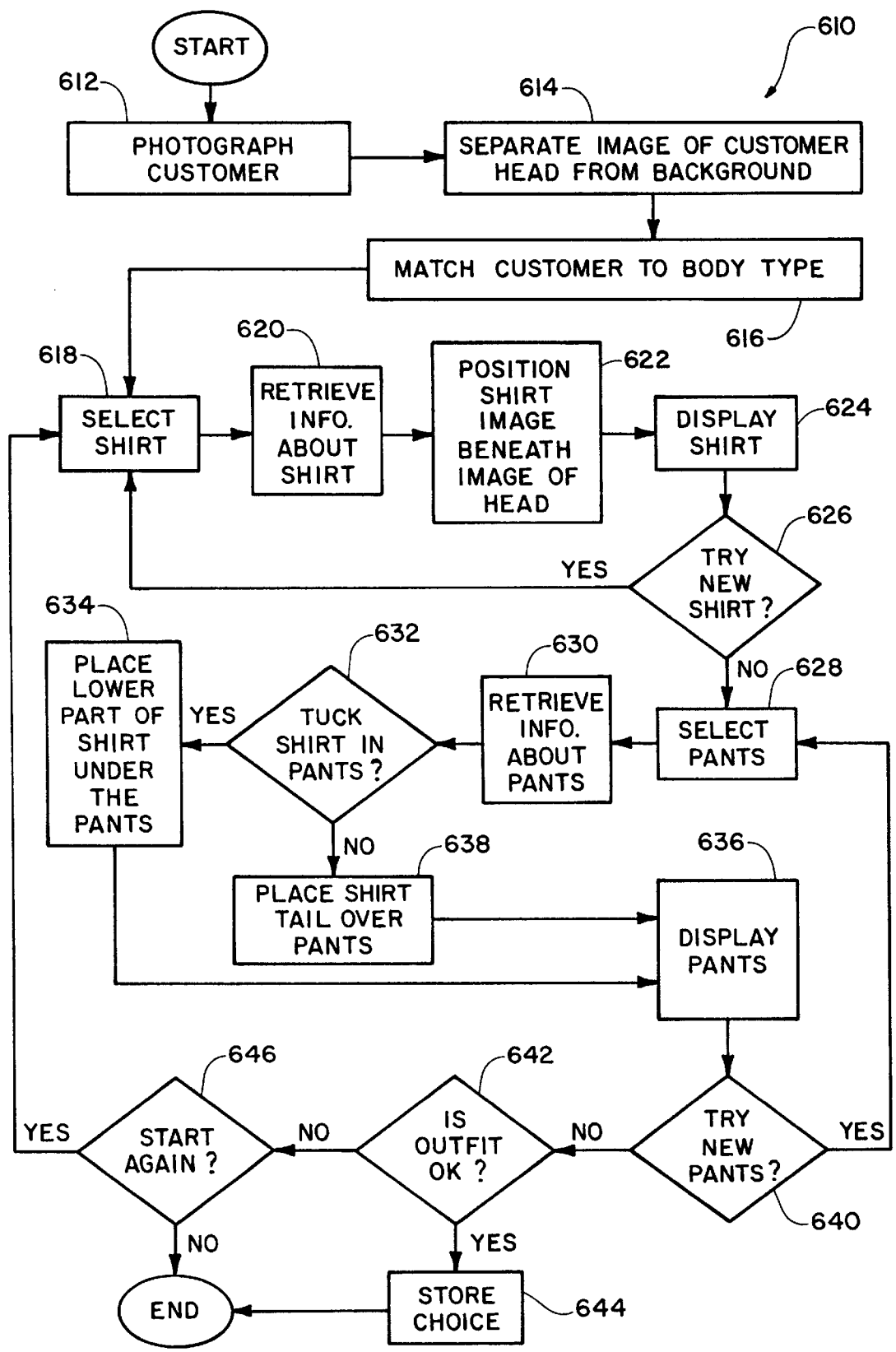
FIG. 6 is a flow chart depicting the operation of the image composition system of FIG. 1.

Considering now the operational flow chart 610 of FIG. 6, the composition of the user selected image 10 begins with obtaining the virtual image of the customer or person 12 at box 612. The head image 26 of the person 12 is separated from the body portion 28 and the background at box 614 to facilitate the combining of the head image 26 with accessory item images. The customer body type is determined at box 616 to enable the appropriate size of accessory item images to be matched therewith.

The shirt image 330 is selected at box 618, wherein information associated with the selected shirt image, including size and attribute information, is retrieved at box 620. The selected shirt image 330 is positioned beneath the head image 26 at box 622, and the combination of the head image 26 and the shirt image 330 is displayed on the monitor 20 at box 624.

The acceptability of the selected shirt image 330 is determined at decision box 626. Where the selected shirt image 330 is acceptable, a pants image 230 is next selected at box 628. However, where the shirt image 330 is not determined to be acceptable at decision box 626, a new shirt image is selected at box 618. The shirt image selection process continues until an acceptable shirt image is determined to be displayed at decision box 626.

Upon the selection of pants image 230 at box 628, information associated with the pants image 230, including size and attribute information, is retrieved at box 630. The attribute information of the shirt image 330 is compared with the attribute information of the pants image 230 at decision box 632 to determine whether the shirt image 330 is to be displayed as being tucked behind the pants image 230. If the shirt image 330 is to be tucked behind the pants image 230, the overlap portion 332 which coincides with the overlap portion 232 is placed under the pants image 230 at box 634, and the pants image 230 is subsequently displayed at box 636 in combination with the head image 26 and the accepted shirt image 330.

Where it is determined at decision box 632 that the shirt image 330 is not to be tucked into the pants image 230, the overlap portion 332 is superimposed over the overlap portion 232 at box 638 before the pants image 230 is displayed at box 636 in combination with the head image 26 and the acceptable shirt image 330.

The acceptability of the selected pants image 230 is determined at decision box 640. Should the selected pants image 230 be determined to be unacceptable, a new pants image is selected at box 628 and the selection of a pants image is repeated again before the newly selected pants image is tested for acceptability at decision box 640.

Where the selected pants image 230 is determined to be acceptable at box 640, the user selected image comprising the combination of the selected shirt image 330 and the selected pants image 230 is detected at decision box 642. Should the user selected image be determined to be acceptable at decision box 642, the information indicative of the selected shirt image 330 and the selected pants image 330 is stored at box 644 before the process is terminated.

However, if it is determined that the user selected image is not acceptable at decision box 642, a determination must be made at decision box 646 as to whether the selection process should be repeated. If it is desired to repeat the selection process, a new shirt is selected at box 618 and the previously described operation is repeated. Should the determination be made that no further selections are to be made, the operation is terminated.

Figure 7:
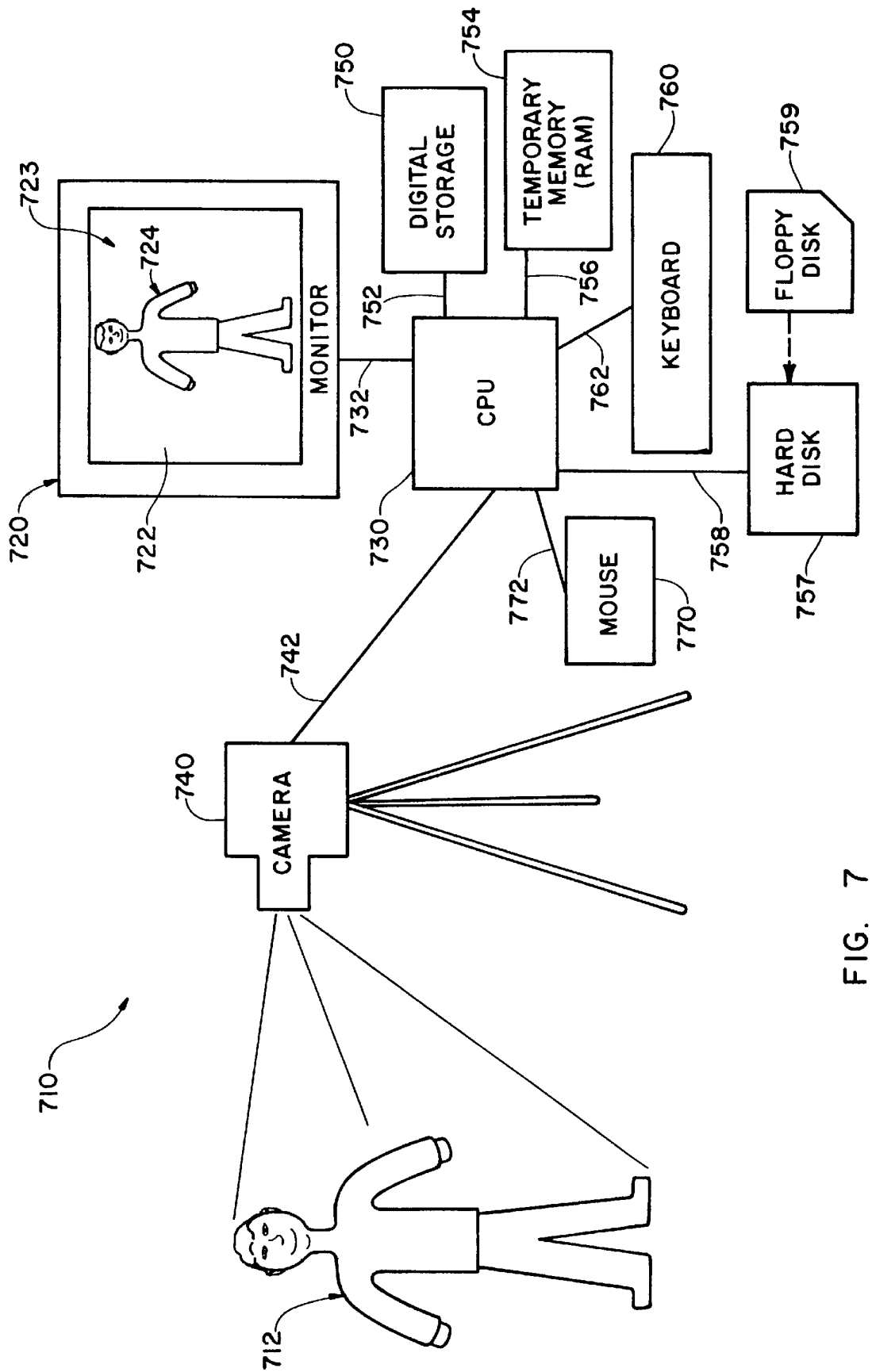
FIG. 7 is a diagrammatical view of another image composition system, which is also constructed in accordance with the present invention.

Referring now to FIG. 7, there is shown another image composition system 710 which is substantially similar to the image composition system 10. In this regard, the system 710 includes a camera 740 for generating target information indicative of a body image 724 base on a person 712. A CPU 730 integrates the image 724 into a user selected image 723 on a monitor 720. Accessory item information is stored in a digital storage or memory device 750 for enabling the image 724 to be combined with accessory items to form the user selected image 723.

Although the construction of the image composition system 710 is substantially similar to the image composition system 10, the operation of the image system 710 facilitates the creation of a user selected image 723 which more closely corresponds to how the person 712 would appear in combination with stored accessory items.

Figure 10:
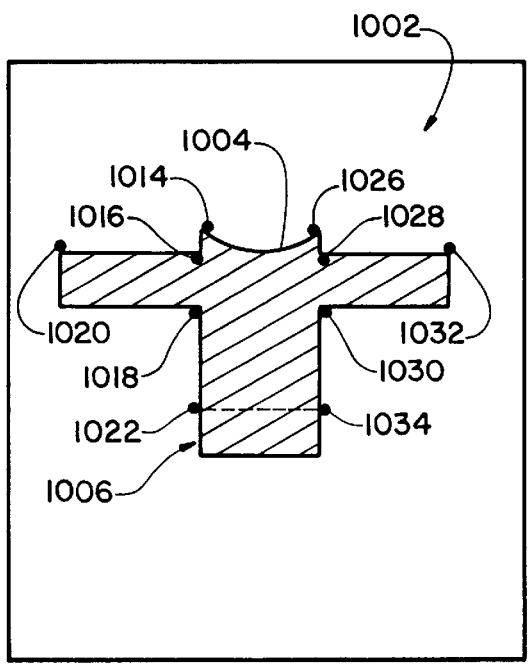
FIG. 10 is a pictorial view of a clothing item used by the image composition system of FIG. 7.
Figure 11:
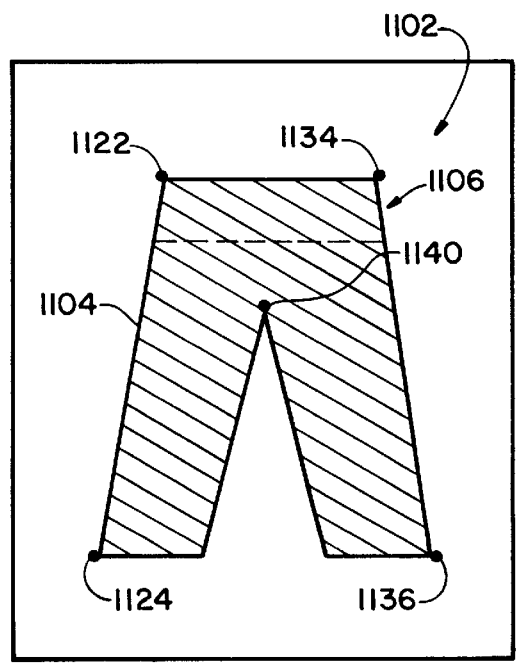
FIG. 11 is a pictorial view of another clothing item used by the image composition system of FIG. 7.

The accessory items for combining with the human or body image 724 include previously stored accessory item information indicative of an accessory image 1002 (FIG. 10) and another accessory image 1102 (FIG. 11). As seen in FIG.

10, the accessory image 1002 includes a shirt image 1004 having shirt match points 1014, 1016, 1018, 1020, 1022, 1026, 1028, 1030, 1032 and 1034 to facilitate conforming the shirt image 1004 to the body image 724. The shirt image 1004 further includes an overlap portion 1006 which is substantially similar to the overlap portion 332 (FIG. 4), and will not be described in greater detail hereinafter.

As seen in FIG. 11, the accessory image 1102 includes pants image 1104 having pants match points 1122, 1124, 1134, 1136 and 1140 to facilitate conforming the pants image 1104 to the body image 724. The pants image 1104 further includes an overlap portion 1106, which is substantially similar to the overlap portion 232 (FIG. 2) and will not be described hereinafter in greater detail.

The accessory item information further includes attribute information for the shirt image 1004 and for the pants image 1104 as described previously in connection with shirt image 330 and pants image 230.

The shirt image 1004 and the pants image 1104 are preferably stored in a predetermined stance or pose to enable the user selected image to appear more life like.

Figure 8:
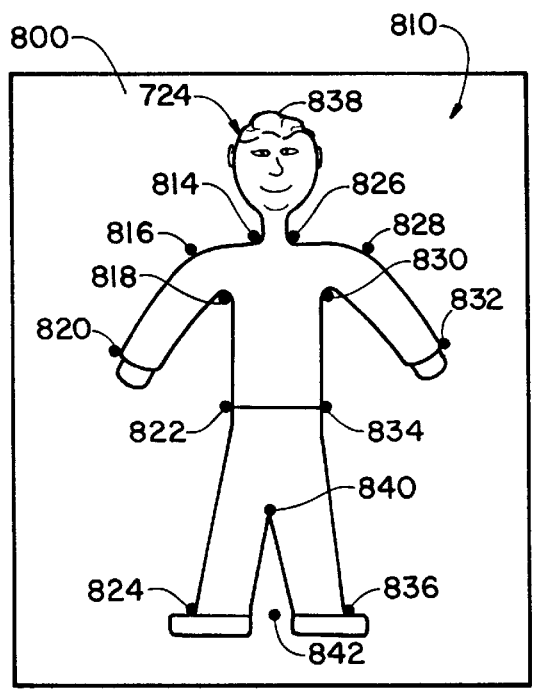
FIG. 8 is a pictorial view of a user selected image used by the image composition system of FIG. 7.
Figure 9:
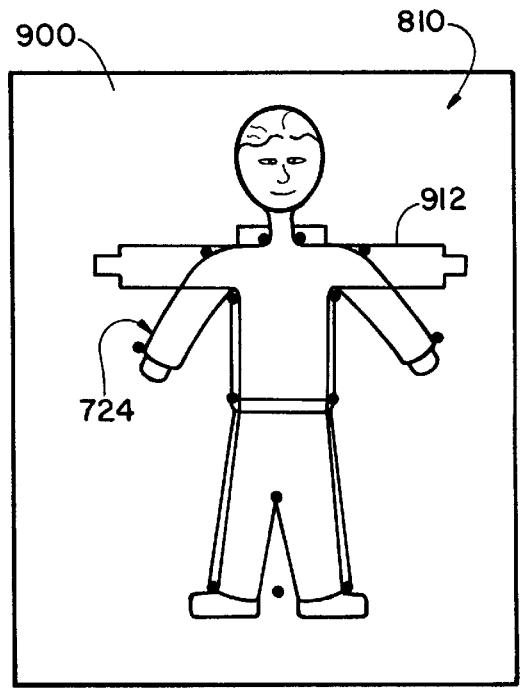
FIG. 9 is a pictorial view of a template for use with the user selected image of FIG. 8.

Considering now the operation of the system 710 in greater detail with reference to FIGS. 7–11, the body image 724 712 is displayed on monitor screen display 722. As seen in FIG. 8, body match points 814, 816, 818, 822, 824, 826, 828, 830, 832, 834, 836, 838, 840 and 842 are identified on the body image 724 in a user selected image 810 displayed on a screen display 800 to facilitate the sizing of the accessory items to be combined with the body image 724 to form the user selected image 723.

The body match points may be identified using a mouse 770, or other device, to identify the top of the head, the neck, the shoulder, the chest, the sleeve, the waist, the inseam, the feet and a base point between the person's feet. Once identified, the body match points are stored for use when combining the accessory items with the body image 724. Although the body match points are shown as visible dots in FIGS. 8–9, the body match points may not be displayed, and simply stored relative to the position on the body image 724.

To facilitate the combining of the accessory items with the body image 724, the person 712 is positioned to enable the body image 724 to coincide with a positioning template 912 displayed in a screen display 900. In this regard, the template 912 is superimposed over the user selected image 810 to enable the person 712 to be positioned until the image 724 fits within the template 912. It will be understood by one skilled in the art that the person 712 may be positioned by other means, including the use of a template with a camera 740, or any equivalent device.

Once the person 712 is positioned, the shirt image 1004 is selected and combined with the body image 724 as user selected image 1210 on screen display 1200. The shirt measure and match points 1014, 1016, 1018, 1020, 1022, 1026, 1028, 1030, 1032, and 1034 are compared with the corresponding body match points 814, 816, 818, 820, 822, 826, 828, 830, 832 and 834, to determine if the shirt image 1004 must be adjusted to match the body image 724.

Figure 12:
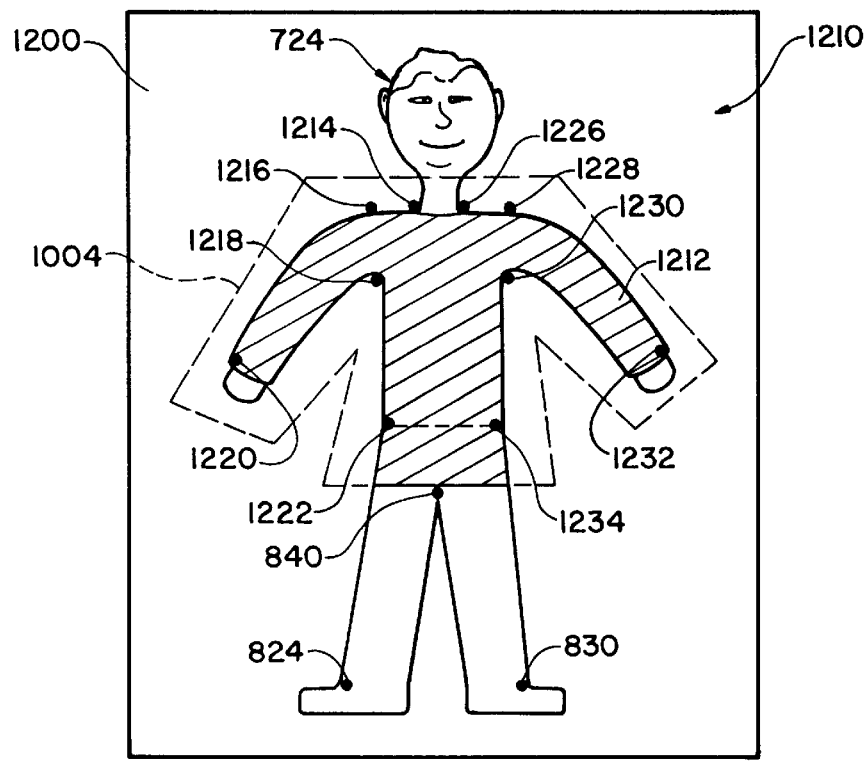
FIG. 12 is a pictorial view of a user selected image, including the clothing item of FIG. 10, displayed by the image composition system of FIG. 7.

As shown in FIG. 12, the shirt image 1004 is initially larger than the body image 724. To conform the shirt image 1004 to the body image 724 as shirt image 1212, the shirt match points 1014, 1016, 1018, 1020, 1022, 1026, 1028, 1030, 1032 and 1034 are adjusted to adjusted match points 1214, 1216, 1218, 1220, 1222, 1226, 1228, 1230, 1232 and 1234, respectively, wherein the adjusted match points correspond substantially to the associated body match points.

In this regard, the distances between adjacent shirt key points (e.g., 1022 and 1034, 1022 and 1018, etc.), are adjusted to match the distances between corresponding body match points. The remaining portions of the adjusted shirt image 1212 are subsequently conformed to the body image 724 by utilizing a suitable software program for art authoring, such as the software marketed under the tradename "Photo Shop," by Adobe Systems, Inc., having a place of business at 1585 Charleston Road, Mountain View, Calif. 94043-1225. Another suitable software program is marketed by Corel Corporation, having a place of business at 1600 Carling Avenue, Ottawa, Ontario, Canada KLV 8R7, under the tradename "Corel Draw!" version No. 6.0.

Such selected programs are employed to adjust the selected added accessory item to the subject image in a closely conforming manner. In this regard, the size of the image of the selected article of clothing can be adjusted to conform closely to the size and shape of the image of the person.

For example, by utilizing the art authoring software program, the pants image 1104 (FIG. 13) is adjusted to conform the pants image 1104 more closely to the body image 724, wherein the pant match points 1122, 1124, 1134, 1136 and 1140 are adjusted to adjusted match points 1322, 1324, 1334, 1336 and 1340, respectively, wherein the adjusted match points correspond to the associated body match points. The resulting user selected image 1310 displayed on the screen display 1500 includes the body image 724 combined with the adjusted shirt image 1212 and the adjusted pants image 1104.

Figure 13:
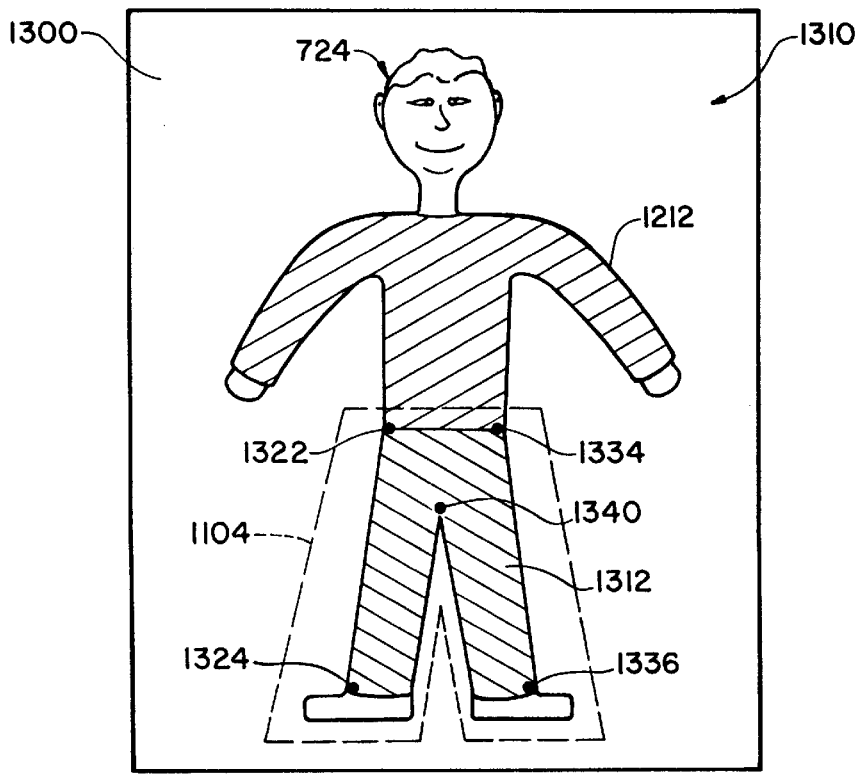
FIG. 13 is a pictorial view of another user selected image, including the clothing item of FIG. 10 and the other clothing item of FIG. 11, displayed by the image composition system of FIG. 1.

The adjustment of the pants image 1104 to conform to the body image 724 is substantially similar to the adjustment of the shirt image, and will not be described in greater detail. As seen in FIG. 13, the pants image 1104 is somewhat larger than the body image 724 in the screen display 1300. Consequently, the pants image 1104 is reduced in size to pants image 1312 to enable the pants image 1312 to conform substantially to the body image 724.

The resulting combination of the body image 724 with shirt image 1212 and pants image 1312 as user selected image 1310 facilitates the visualization of the person 712 wearing a shirt (not shown) and pants (not shown) corresponding to the shirt image 1212 and the pants image 1312, without the person 712 actually wearing the shirt and pants.

Figure 14A:
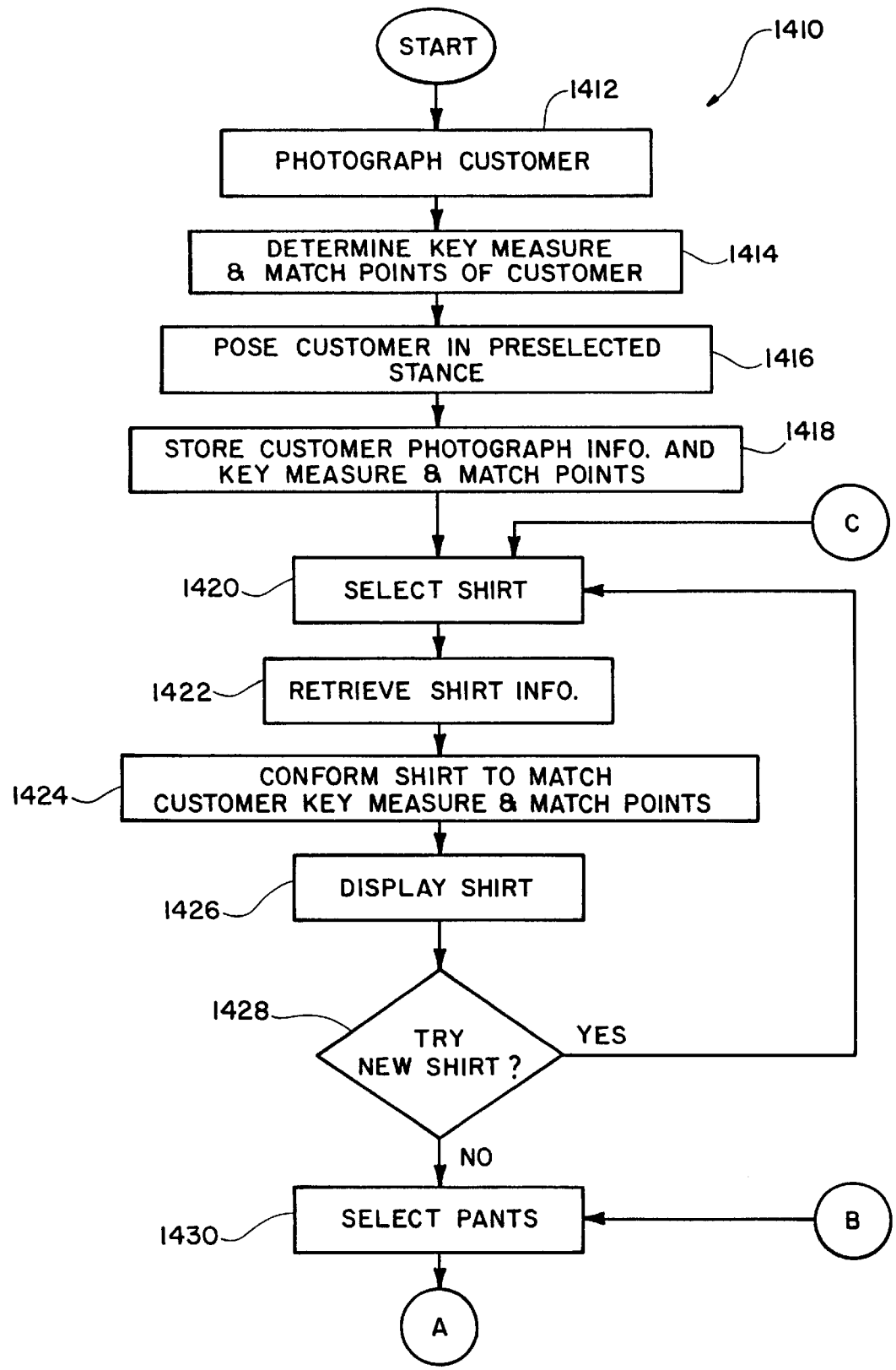
FIGS. 14A–14B set forth a flow chart illustrating the operation of the image composition system of FIG. 7.
Figure 14B:
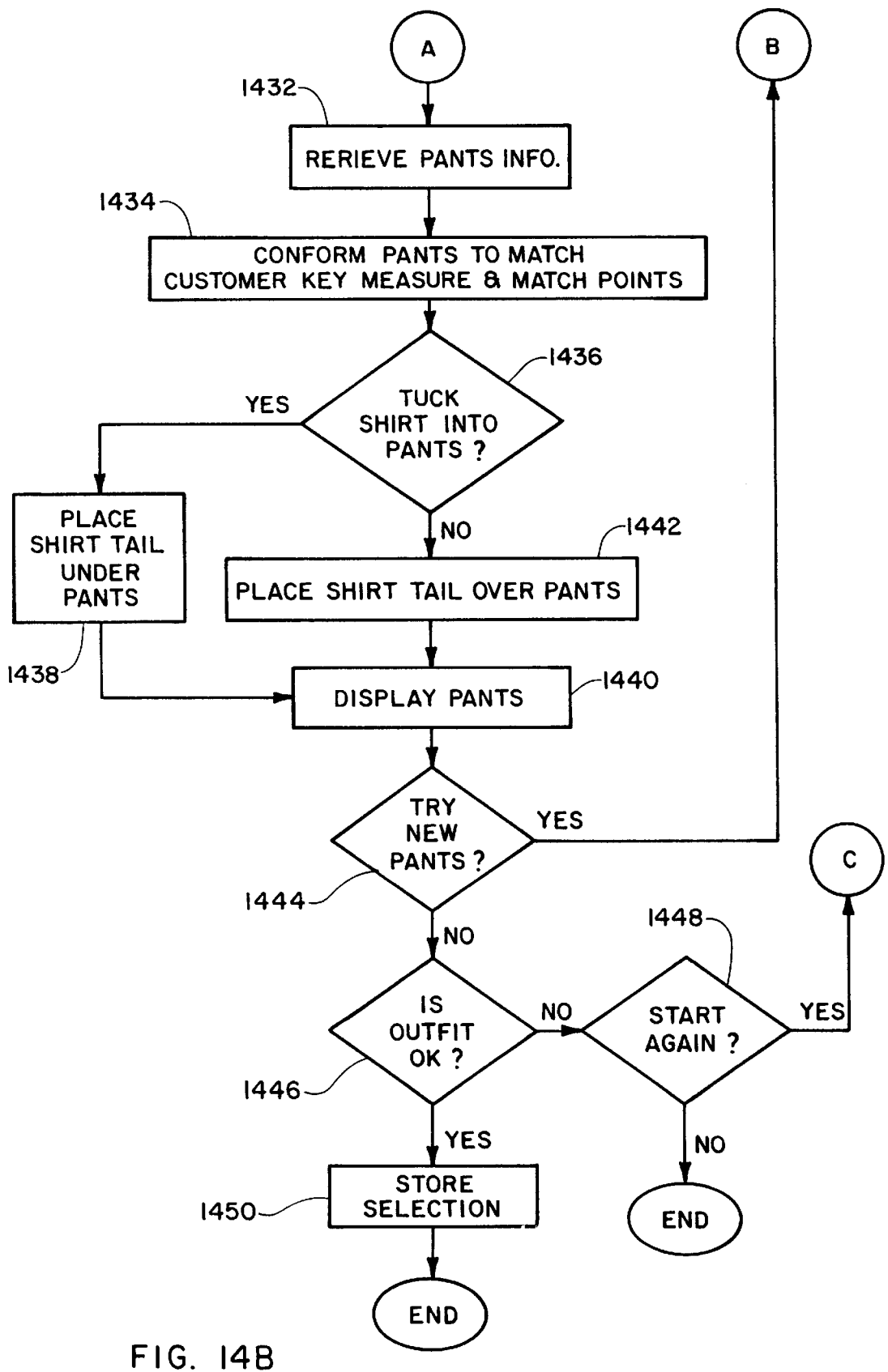

Considering now the operation of the image composition system 710 with reference to FIGS. 14A–14B, there is shown a flowchart 1410 describing the process of composing the user selected image 723. Initially, the person 712 is photographed at box 1412 to enable the body image to be displayed. Body match points for the person 712 are determined at box 1414. The person 712 is then positioned in a preselected stance or pose at box 1416 for facilitating the proper alignment of the accessory items with the body image 724. The body image information indicative of the body image 724, as well as the associated body match points, are stored at box 1418.

The selection of a shirt image 1004 for combining with the body image 724 is accomplished at box 1420. Information associated with the shirt image 1004 is retrieved at box 1422, including shirt match points. The body match points are compared with the shirt match points, and the shirt match points are adjusted to adjusted shirt match points at box 1424. The adjusted shirt image 1212 is then displayed at box 1426.

A determination is made at decision box 1428 as to the acceptability of the selected shirt image 1212. Where the selected shirt image 1212 is acceptable, a pants image 1104 is selected at box 1430. If the selected shirt image 1212 is not determined to be acceptable at decision box 1428, a new shirt image is selected at box 1420.

Where it is determined that an acceptable shirt image 1212 was selected, and the pants image 1104 has been selected at box 1430, pants image information associated with the pants image 1104 is retrieved at box 1432. The pants image information includes pants match points associated therewith.

The retrieved pants match points are compared with the associated body match points, and are adjusted to adjusted pant match points at box 1434. A determination is then made at decision box 1436 as to whether it is desired that the shirt image 1212 be tucked into the adjusted pants image 1312. If it is desired to tuck the shirt image 1212 into the pants image 1312, the overlap portion of the pants image 1312 is superimposed over the overlap portion of the shirt image 1212 at box 1438, and the pants image 1312 is then displayed at box 1440.

However, where it is desired to not tuck the shirt image 1212 into the pants image 1312, the overlap portion of the shirt image 1212 is superimposed over the overlap portion of the pants image 1312 at box 1442 before the pants image 1312 is displayed at box 1440.

A determination is made at decision box 1444 regarding the acceptability of the selected pants image 1312. If the selected pants image 1312 is not acceptable, another pants image is selected at box 1430. However, if the selected pants image 1312 is acceptable, a decision is made at decision box 1446 regarding the acceptability of the user selected image 1310 including the combination of the body image 724 with the selected shirt image 1212 and the selected pants image 1312 at decision box 1446.

If the user selected image 1310 is not acceptable, a decision is made at decision box 1448 as to whether the selection process should begin again. A decision to start the selection process again enables a new shirt image to be selected at box 1420. However, if it is not desired to start the selection process again, the process is terminated.

Where it is determined that the user selected image 1310 is acceptable at decision box 1446, information indicative of the selected pants image 1312 and shirt image 1212 are stored at box 1450 before the process is terminated.

Figure 15:
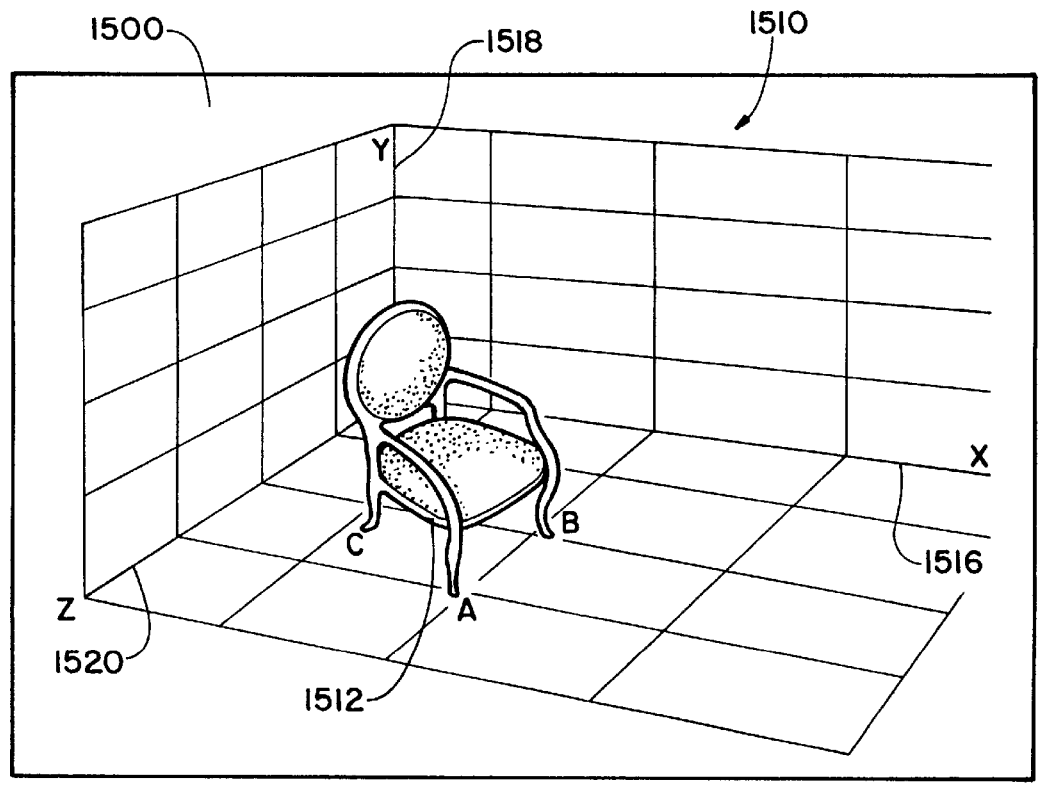
FIG. 15 is a pictorial view of another user selected image.
Figure 16:
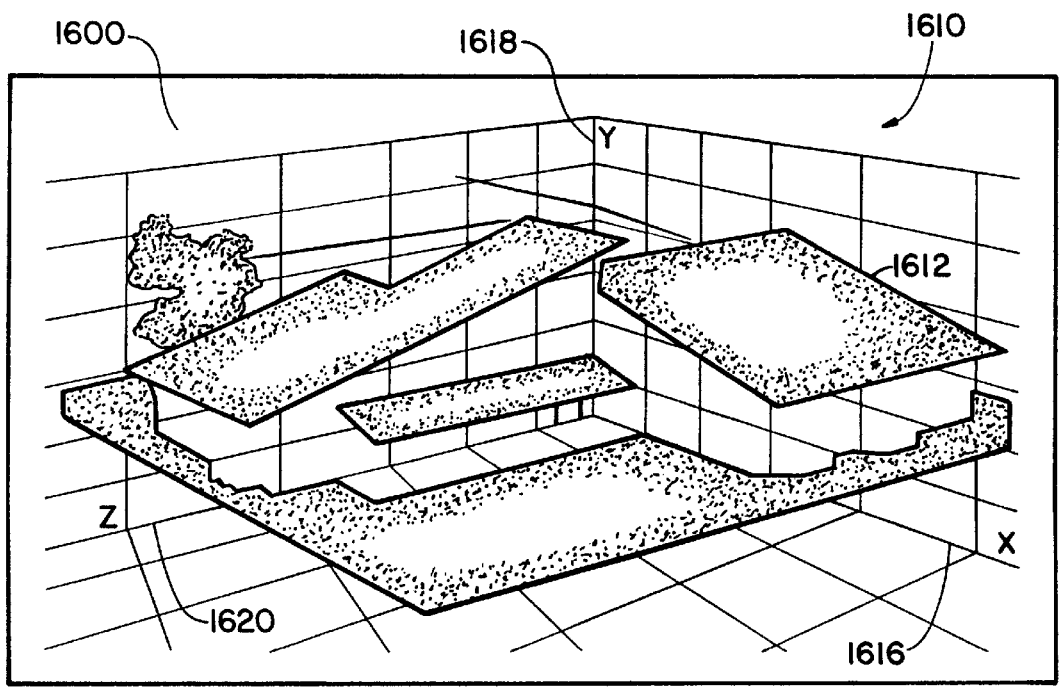
FIG. 16 is a pictorial view of a further user selected image.

While the preceding description concerns the use of an image composition system for facilitating the visualization of clothing items on a person, the inventive image composition system may also be utilized for interior design layouts (FIG. 15), or for landscaping design layouts (FIG. 16). As shown in FIG. 15, the subject of the user selected image 1510 is a chair (not shown) in a room (not shown). Utilizing the inventive system, the chair and room may be utilized to facilitate the visualization of an interior design layout relative to the chair and the room.

In this regard, a chair image 1512 is displayed on a screen display 1500 as a user selected image 1510. Stored accessory items, such as rugs, lamps, tables, etc., may be positioned relative to the chair image 1612 to facilitate the visualization of the subject chair with the accessory items. Unlike the image composition systems 10 and 710 which are two dimensional, the interior design layout of FIG. 15 utilizes a three-dimensional perspective view. In this regard, the user selected image 1510 is created based on an X-axis 1516, a Y-axis 1518 and a Z-axis 1520.

Another subject for use with the inventive image composition system is a landscape design layout (FIG. 16). Thus, the inventive image composition system may be utilized to visualize the subject house as a house image on a screen display 1600 as a user selected image 1610 to enable the subject house to be visualized in combination with accessory items such as trees, shrubs, gardens, etc. As with the interior design layout of FIG. 15, the landscaping layout design of FIG. 16 is preferably three-dimensional, and includes an X-axis 1616, a Y-axis 1618 and a Z-axis 1620.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An image composition system, comprising:

display means for displaying a user selected image to facilitate viewing an image of a person in a virtual environment, said user selected image including a human image representative of said person;

control means coupled to said display means for integrating said human image into said user selected image to view said human image in said user selected image for enabling the visualization of said person in a real scene corresponding to said user selected image, wherein said human image defines a core element of said user selected image;

camera means coupled to said control means for generating human image video information indicative of said human image to reproduce said person in said virtual environment; and memory means coupled to said control means for storing clothing video information including clothing item information indicative of a clothing item image to permit said clothing item image to be combined with said human image for forming said user selected image, said clothing item image being representative of a real environment clothing item capable of being worn by said person, wherein said clothing item image defines an accessory element to be positioned relative to said core element so that said user selected image facilitates the visualization of a real environment combination of said person and said clothing item without said clothing item being physically present with said person in said real scene;

wherein said human image includes a head image representative of a head portion only of said person, said clothing video information further including mannequin information indicative of a mannequin image wearing said clothing item image, and wherein said mannequin image is coupled below said head image in said user selected image, whereby said head image, said mannequin image and said clothing item image are displayed as said user selected image;

means defining a plurality of measure and match point indicia on said clothing item image to facilitate fitting conformally said clothing item image to said human image;

means defining a plurality of body match point indicia on said human image to correspond with individual ones of said plurality of measure and match point indicia;

means for comparing measure and match point indicia with said body match point indicia to determine if a size adjustment is required;

means for adjusting measure and match point indicia to said body match point indicia to correspond substantially therewith; and means for adjusting the remaining portions of said clothing item image to conform substantially to said human image.

2. An image composition system according to claim 1, wherein said human image has an associated body type, and said clothing item information and said mannequin information include size information for said clothing item image and said mannequin image to enable said clothing item image and said mannequin image to correspond to said body type.

3. An image composition system according to claim 2, wherein said clothing video information further includes additional clothing item information indicative of another clothing item image capable of being combined with said human image and said clothing item image to form said user selected image, said clothing item information further including clothing item attribute information and said additional clothing item information including additional clothing item attribute information to help determine the positional relationship of said clothing item image relative to said another clothing item image when said clothing item image and said additional clothing item image coincide in said user selected image.

4. An image composition system, comprising:

display means for displaying a user selected image to facilitate viewing in image of a person in a virtual environment, said user selected image including a human image representative of said person;

control means coupled to said display means for integrating said human image into said user selected image to view said human image in said user selected image for enabling the visualization of said person in a real scene corresponding to said user selected image, wherein said human image defines a core element of said user selected image;

camera means coupled to said control means for generating human image video information indicative of said human image to reproduce said person in said virtual environment;

memory means coupled to said control means for storing clothing video information including clothing item information indicative of a clothing item image to permit said clothing item image to be combined with said human image for forming said user selected image, said clothing item image being representative of a real environment clothing item capable of being worn by said person, wherein said clothing item image defines an accessory element to be positioned relative to said core element so that said user selected image facilitates the visualization of a real environment combination of said person and said clothing item without said clothing item being physically present with said person in aid real scene;

wherein said human image includes an entire body image of said person, said clothing item image and said body image defining an overlap portion of said body image, said overlap portion defining an area for cooperating with other accessory items, where said clothing item image and said body image coincide, and wherein said clothing item image and said body image less said overlap portion are displayed as said user selected image;

means defining a plurality of measure and match point indicia on said clothing item image to facilitate fitting conformally said clothing item image to said human image;

means defining a plurality of body match point indicia on said human image to correspond with individual ones of said plurality of measure and match point indicia;

means for comparing measure and match point indicia with said body match point indicia to determine if a size adjustment is required;

means for adjusting measure and match point indicia to said body match point indicia to correspond substantially therewith; and means for adjusting the remaining portions of said clothing item image to conform substantially to said human image.

5. An image composition system according to claim 4, further including indicating means for identifying a plurality of body image match points to facilitate the combining of said clothing item image with said body image in said user selected image.

6. An image composition system according to claim 5, wherein said clothing item information includes clothing match points corresponding to at least two of said body image match points for helping to position said clothing item image relative to said body image.

7. An image composition system according to claim 6, further including adjusting means for modifying said clothing item match points to enable them to coincide substantially with said corresponding body image match points for conforming said clothing item image to said body image.

8. An image composition system according to claim 4, further including positioning means for arranging said person in a predetermined pose to facilitate combining said clothing item image with said body image to form said user selected image, and wherein said clothing item information is indicative of said clothing item image positioned in a clothing item pose corresponding to said predetermined pose.

9. An image composition system according to claim 4, wherein said clothing video information further includes additional clothing item information indicative of another clothing item image capable of being combined with said body image and said clothing item to form said user selected image, said clothing item information including clothing item attribute information and said additional clothing item information including additional clothing item attribute information to help determine the positional relationship of said clothing item image relative to said another clothing item image when said clothing item image and said additional clothing item image coincide in said user selected image.

10. A method of composing a user selected image, comprising:

displaying the user selected image to facilitate viewing a person in a virtual environment, the user selected image including a human image representative of said person;

integrating said human image with the user selected image to view said human image and the user selected image for enabling the visualization of said person in a real scene corresponding to the user selected image, wherein said human image defines a core element of the user selected image;

generating human image video information indicative of said human image to reproduce said person in said virtual environment;

storing clothing video information including clothing item information indicative of a clothing item image to permit said clothing item image to be combined with said human image for forming the user selected image, said clothing item image being representative of a real environment clothing item capable of being worn by said person, wherein said clothing item image defines an accessory element to be positioned relative to said core element so that the user selected image facilitates the visualization of a real environment combination of said person an said clothing item without said clothing item being physically present with said person in said real scene;

displaying a head image from said human image, said head displaying a mannequin image wearing said clothing item image, and coupling said mannequin image below said head image in the user selected image, whereby said head image, said mannequin image and said clothing item image are displayed as the user selected image;

defining a plurality of measure and match point indicia on said clothing item image to facilitate fitting conformally said clothing item image to said human image;

defining a plurality of body match point indicia on said human image to correspond with individual ones of said plurality of measure and match point indicia;

comparing measure and match point indicia with said body match point indicia to determine if a size adjustment is required;

adjusting measure and match point indicia to said body match point indicia to correspond substantially therewith; and adjusting the remaining portions of said clothing item image to conform substantially to said human image.

11. A method according to claim 10, further including identifying an associated body type for said human image, and storing size information for said clothing item image and said mannequin image to enable said clothing item image and said mannequin image to correspond to said body type.

12. An image composition system according to claim 11, further including storing additional clothing item information indicative of another clothing item image capable of being combined with said human image and said clothing item image to form the user selected image, and storing clothing item attribute information and additional clothing item attribute information to help determine the positional relationship of said clothing item image relative to said another clothing item image when said clothing item image and said additional clothing item image coincide in said the selected image.

13. An image composition system according to claim 10, further including using an entire body image of said person, said clothing item image and said body image defining an overlap portion of said body image where said clothing item image and said body image coincide, and displaying said clothing item image and said body image less said overlap portion as the user selected image.

14. An image composition system according to claim 13, further including identifying a plurality of body image match points to facilitate the combining of said clothing item image with said body image in the user selected image.

15. An image composition system according to claim 14, further including storing clothing match points corresponding to at least two of said body image match points for helping to position said clothing item image relative to said body image.

16. An image composition system according to claim 15, further including modifying said clothing item match points to enable them to coincide substantially with said corresponding body image match points for conforming said clothing item image to said body image.

17. An image composition system according to claim 13, further including arranging said person in a predetermined pose to facilitate combining said clothing item image with said body image to form said user selected image, and storing said clothing item image positioned in a clothing item pose corresponding to said predetermined pose.

18. An image composition system according to claim 13, further including storing additional clothing item information indicative of another clothing item image capable of being combined with said body image and said clothing item to form the user selected image, and storing clothing item attribute information and additional clothing item attribute information to help determine the positional relationship of said clothing item image relative to said another clothing item image when said clothing item image and said additional clothing item image coincide in the user selected image.

19. A method of composing a user selected image comprising:

displaying a human image;

storing and displaying a clothing item image;
defining a plurality of measure and match point indicia on said clothing item image to facilitate fitting conformally said clothing item image to said human image;

defining a plurality of body match point indicia on said human image to correspond with individual ones of said plurality of measure and match point indicia;

comparing measure and match point indicia with said body match point indicia to determine if a size adjustment is required;

adjusting measure and match point indicia to said body match point indicia to correspond substantially therewith; and adjusting the remaining portions of said clothing item image to conform substantially to said human image.

\* \* \* \* \*